(12) United States Patent
Patel et al.

(10) Patent No.: US 9,420,554 B1
(45) Date of Patent: Aug. 16, 2016

(54) DETERMINING CORRECT DEVICE VOLTE STATUS FOR CALL ROUTING

(71) Applicant: Verizon Patent and Licensing Inc., Arlington, VA (US)

(72) Inventors: Gaurav B. Patel, Bridgewater, NJ (US); Gunjan Thakkar, McKinney, TX (US); Jeffrey R. Evans, Lovettsville, VA (US); Yi Jing, Cambridge, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/641,786

(22) Filed: Mar. 9, 2015

(51) Int. Cl.
*H04W 60/00* (2009.01)
*H04L 29/06* (2006.01)

(52) U.S. Cl.
CPC .......... *H04W 60/00* (2013.01); *H04L 65/1006* (2013.01); *H04L 65/40* (2013.01)

(58) Field of Classification Search
CPC ........................................................ H04W 4/00
USPC ........................................................ 455/435.1
See application file for complete search history.

(56) References Cited

U.S. PATENT DOCUMENTS

| | | | | |
|---|---|---|---|---|
| 8,346,254 B2* | 1/2013 | Vikberg | ................ | H04W 60/02 370/328 |
| 2009/0207808 A1* | 8/2009 | McCann | ........... | H04W 36/0016 370/331 |
| 2015/0119034 A1* | 4/2015 | Li | ..................... | H04W 36/0022 455/435.2 |

* cited by examiner

*Primary Examiner* — Huy C Ho

(57) ABSTRACT

A network node receives a registration message, where the registration message is associated with registering a user equipment (UE) with a call signaling network for sending or receiving calls. The network node receives a notification message from a call session control node in the call signaling network, where the notification message indicates whether the UE is currently provisioned to engage in calls via a Voice over Long Term Evolution (VoLTE) network. The network node causes calls to or from the UE to be routed via the VoLTE network if the notification message indicates that the UE is currently provisioned to engage in calls via the VoLTE network, and causes calls to or from the UE to be routed via a legacy network, that is different than the VoLTE network, if the notification message indicates that the UE is currently not provisioned to engage in calls via the VoLTE network.

20 Claims, 7 Drawing Sheets

DETERMINING CORRECT DEVICE VOLTE STATUS FOR CALL ROUTING

BACKGROUND

The Internet Protocol (IP) multimedia subsystem (IMS), defined by the 3$^{rd}$ Generation Partnership Project (3GPP), is an architectural framework for implementing IP-based telephony and multimedia services. IMS defines a set of specifications that enables the convergence of voice, video, data and mobile technology over an all IP-based network infrastructure. In particular, IMS fills the gap between the two most successful communication paradigms—cellular and Internet technology, by providing Internet services everywhere using cellular technology in a more efficient way. Session Initiation Protocol (SIP) is the main protocol for IMS. SIP is an application layer control (signaling) protocol for creating, modifying and terminating sessions (e.g., voice sessions) with one or more participants.

A Voice over Long Term Evolution (VoLTE) network is based on the IMS network and provides Internet Protocol (IP) based voice and data service via a network complying with the LTE standard. VoLTE has more voice and data capacity than other wireless networks, while using less available bandwidth due to the use of smaller packet headers.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

The VoLTE network service, offered by Verizon, allows eligible subscribers to take advantage of its 4G LTE network in addition to its legacy Code Division Multiple Access (CDMA) network for voice calls. With the addition of the VoLTE service, when a call is being made the network currently needs to make a decision whether it should route the call to a subscriber device via the VoLTE network or via the legacy CDMA network. Calls being delivered to a subscriber via VoLTE often lead to a rejection of the calls due to a "VoLTE status mismatch" condition, resulting in a SIP 488 error message. A "VoLTE status mismatch" may occur when the user subscription changes after the occurrence of a network query for the VoLTE status of the user's device. For example, the user is not subscribed to VoLTE service at the time of purchasing and turning on a given device, but at a later point in time the user's subscription is modified and the VoLTE service is added. This results in the behavior of the user's device, which is unaware of the addition of the VoLTE service, being out of synch with the user's subscription. When such an error occurs, the network continues to retry and attempt to redeliver the call to the subscriber via the legacy network, thereby causing additional signaling, latency and call delay. Such errors, therefore, negatively impact the efficiency and performance of the network.

Exemplary embodiments described herein introduce additional decision making into the IMS signaling network to track network device interaction failures (or successes) related to provisioning of VoLTE service to network service provider users. An additional node in the IMS signaling network maintains an awareness of the current VoLTE provisioning status of each user's device such that the additional node can cause calls to or from the user's device to be routed via the appropriate VoLTE or legacy network based on the current VoLTE provisioning status. When a given user device has not yet been VoLTE provisioned, or is currently not VoLTE provisioned, the additional node in the IMS signaling network causes a call to or from the user device to be routed via the legacy network. When the given user device has been VoLTE provisioned, and is currently VoLTE provisioned, the additional node in the IMS signaling network causes the call to or from the user device to be routed via the VoLTE network.

Figure 1A:
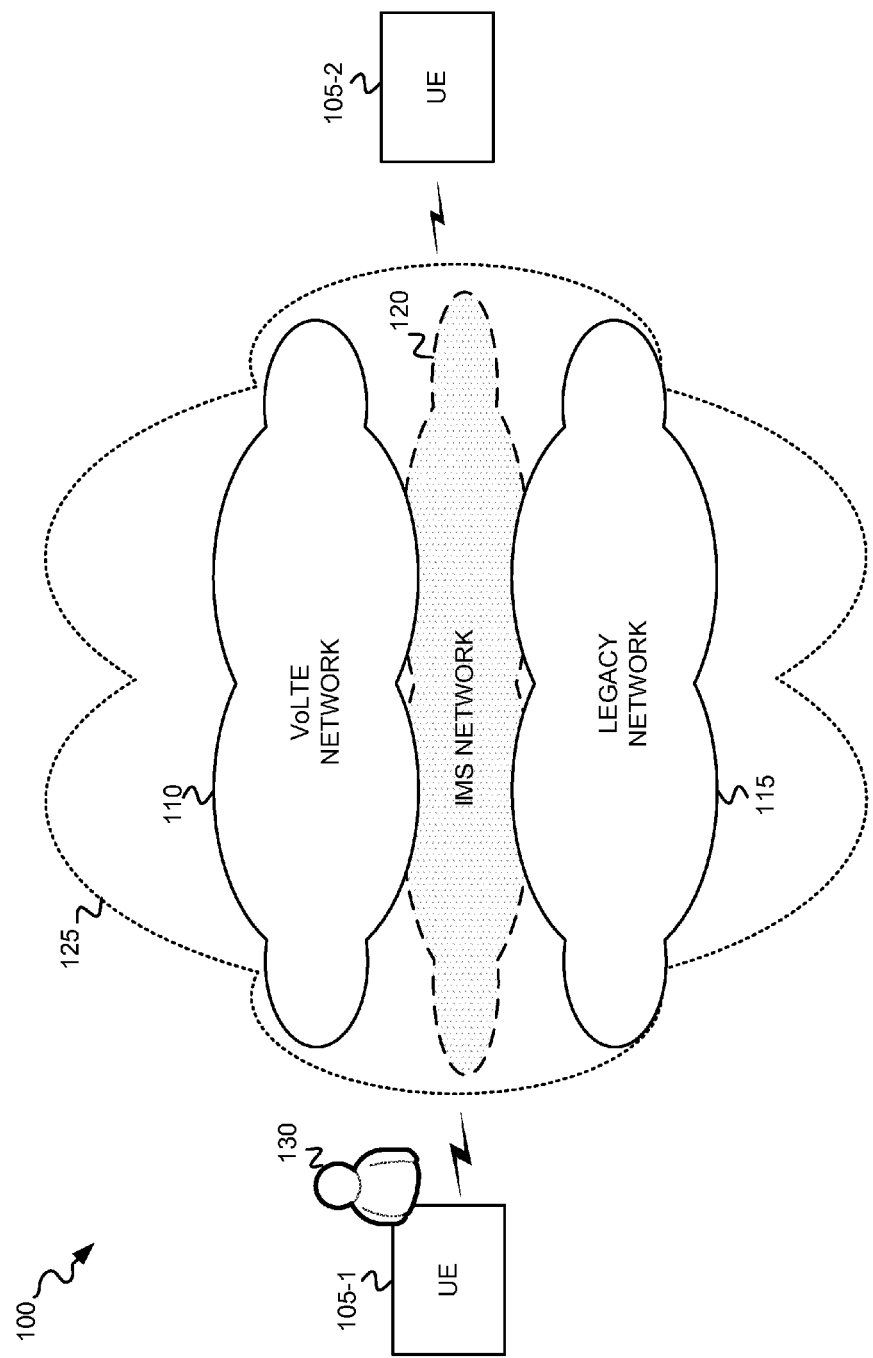
FIGS. 1A and 1B depict an exemplary network environment in which calls may be routed to or from user equipment via either a legacy circuit-switched network or a packet-switched VoLTE network depending on a VoLTE provisioning status associated with the user equipment.

FIG. 1A depicts an exemplary network environment 100 in which calls may be routed to or from a user equipment (UE) 105-1, via either a legacy network 115 or a packet-switched Voice over Long Term Evolution (VoLTE) network 110, depending on a VoLTE provisioning status associated with UE 105-1. As shown in FIG. 1A, a user 130 may be associated with UE 105-1, where user 130 may include the owner or temporary user of UE 105-1. As further shown, network environment 100 may include UEs 105-1 and 105-2 (generically and individually referred to herein as "UE 105"), connected with a network 125 via wired or wireless links. Network 125 may include multiple different sub-networks of various types, including VoLTE network 110, legacy network 115, and an IMS network 120. Network 125 may also include one or more wired networks, such as, for example, a local area network (LAN), a wide area network (WAN), a metropolitan area network (MAN), a cable network, a Public Switched Telephone Network (PSTN), an intranet, and/or the Internet. VoLTE network 110 and legacy circuit-switched network 115 may include one or more wireless-based networks, such as, for example, a wireless satellite network and/or a wireless public land mobile network (PLMN). Legacy network 115 may implement circuit-switched telephony, and VoLTE network 110 may implement packet-switched telephony, where the packet-switched telephony may include IP-based telephony. IMS network 120 may use SIP for voice and multimedia session control, such as for creating, modifying and terminating sessions between devices (e.g. UEs 105-1 and 105-2).

UEs 105-1 and 105-2 may each include, for example, a telephone (land-line or mobile), a personal digital assistant (PDA), a telematics device coupled to a communication bus of a vehicle, or a computer (e.g., tablet, desktop, palmtop, laptop, or wearable computer). UEs 105-1 and 105-2 may each execute a respective phone client (not shown) that may send/receive voice and/or video calls to/from network 125 and may send/receive SIP signaling messaging to/from IMS network 120.

The configuration of network components of network environment 100 is shown in FIG. 1A is for illustrative purposes. Other configurations may be implemented. Therefore, network environment 100 may include additional, fewer and/or different components that may be configured in a different arrangement than that depicted in FIG. 1A. For example, network environment 100 may include numerous UEs (e.g., UEs 105-1 through 105-x, where x>2).

Figure 1B:
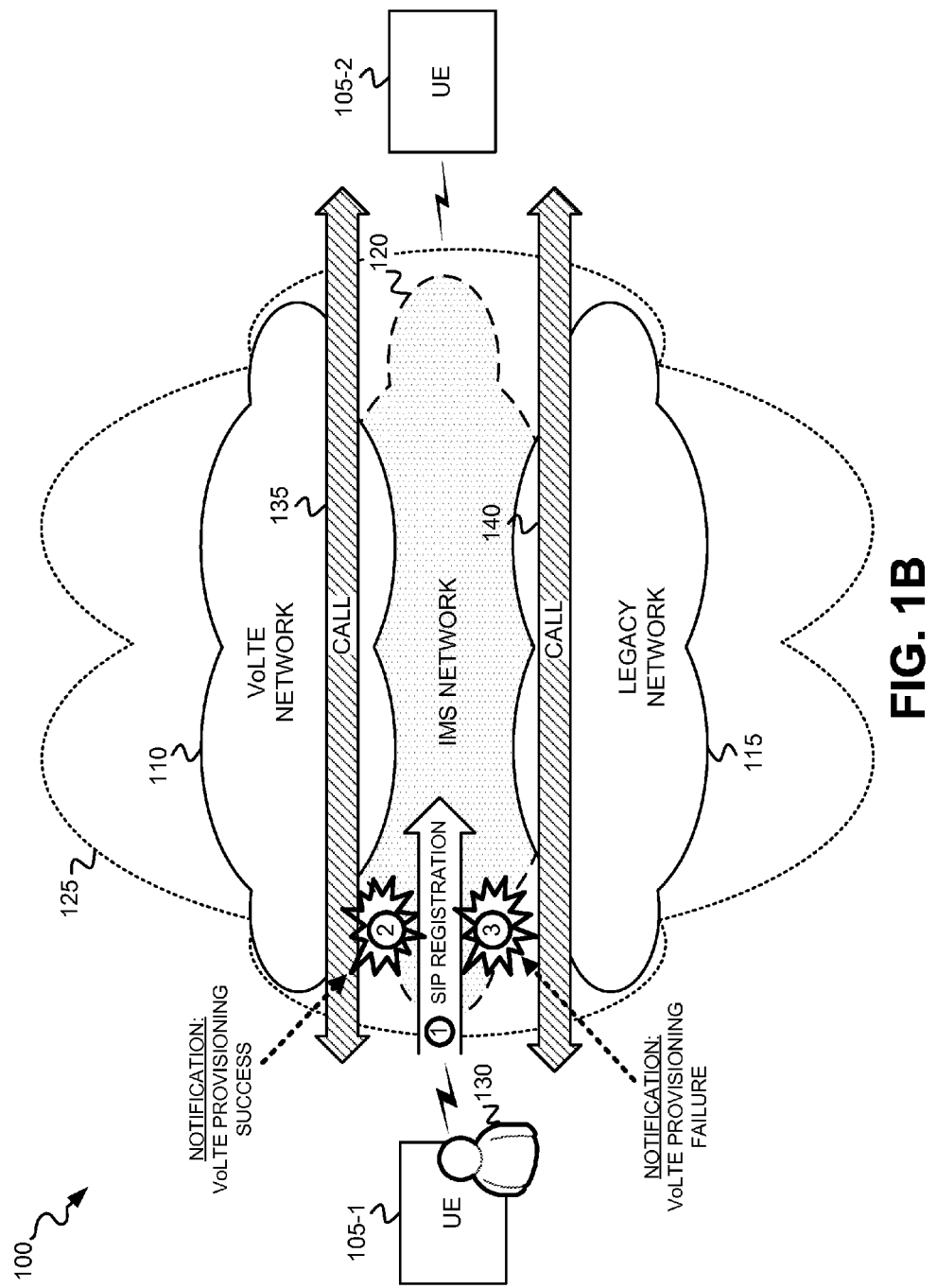

FIG. 1B depicts the exemplary network environment 100 of FIG. 1A in which UE 105-1, prior to sending or receiving any calls, registers with IMS network 120 and, upon registration, IMS network 120 determines whether user 130 of UE 105-1 has subscribed to usage of VoLTE network 110 and whether UE 105-1 has been successfully provisioned for sending/receiving calls via VoLTE network 110. As shown in FIG. 1B, UE 105-1 sends a SIP registration (identified with a "1" within a circle) to IMS network 120 for registering UE 105-1 with IMS network 120 so that UE 105-1 may send and receive voice calls via VoLTE network 110 or legacy circuit-switched network 115. Prior to SIP registration, or sometime after SIP registration, user 130 changes their subscription to enable the use of VoLTE network 110 instead of, or in addition to, use of legacy circuit-switched network 115. UE 105-1 performs a VoLTE provisioning status check process and, based on the VoLTE provisioning status of UE 105-1, IMS network 120 may return a notification to UE 105-1 that indicates whether or not UE 105-1 is provisioned to use VoLTE network 110. In embodiments described herein, if a notification (identified with a "2" within a circle) indicates that VoLTE provisioning has been successful for UE 105-1, then IMS network 120 causes voice calls to or from UE 105-1 to be routed via VoLTE network 110. For example, as shown in FIG. 1B, a call 135 is routed from UE 105-1 to UE 105-2 via VoLTE network 110 when VoLTE provisioning has been successful. Alternatively, if a notification (identified with a "3" within a circle) indicates that VoLTE provisioning has not yet been successful for UE 105-1, then IMS network 120 causes voice calls to or from UE 105-1 to be routed via legacy circuit-switched network 115, instead of via VoLTE network 110. For example, as shown in FIG. 1B, a call 140 is routed from UE 105-1 to UE 105-2 via legacy circuit-switched network when VoLTE provisioning has not been successful.

Figure 2:
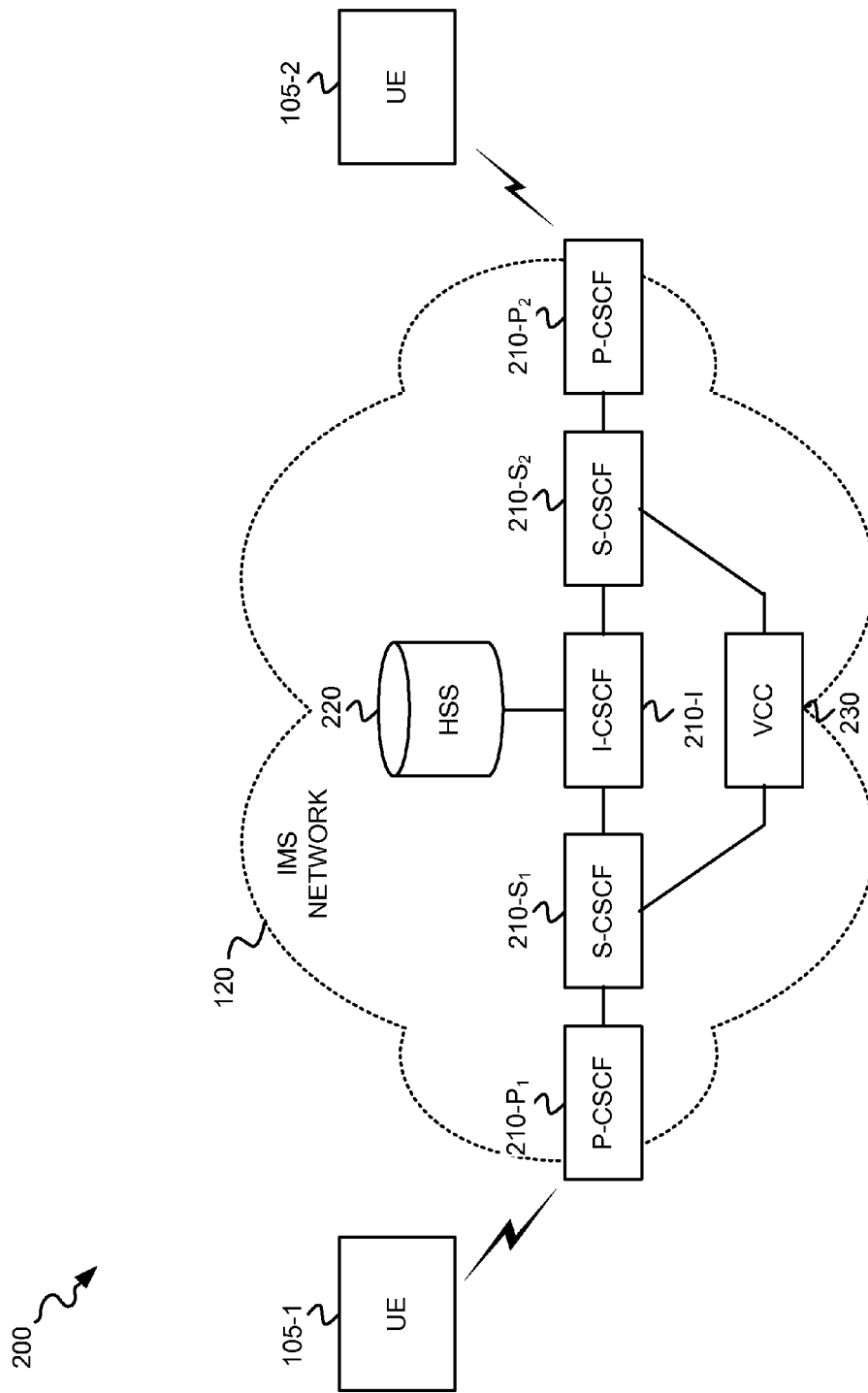
FIG. 2 depicts a portion of the network environment of FIG. 1A, including components of an IMS network.

FIG. 2 depicts a portion 200 of the network environment of FIG. 1A, including components of IMS network 120. As shown, IMS network 120 may include a Proxy Call Session Control Function (P-CSCF) 210-P$_1$, a serving Call Session Control Function (S-CSCF) 210-S$_1$, an Interrogating Call Session Control Function I-CSCF 210-I, a S-CSCF 210-S$_2$, a P-CSCF 210-P$_2$, a Home Subscriber Server (HSS) 220, and a Voice Call Continuity (VCC) node 230. P-CSCF 210-P$_1$, S-CSCF 210-S$_1$, I-CSCF 210-I, S-CSCF 210-S$_2$, and P-CSCF 210-P$_2$ may be generically and individually referred to herein as "CSCF 210".

P-CSCF 210-P$_1$ acts as an edge of IMS network 120 through which UE 105-1 obtains access. P-CSCF 210-P$_1$ maintains an awareness of all IMS endpoints that are currently registered with IMS network 120, and performs various manipulations of SIP signaling messages that are arriving from, or being sent to, the IMS endpoints (e.g, UEs 105-1 and 105-2). P-CSCF 210-P$_1$ maintains a connection with S-CSCF 210-S$_1$.

S-CSCF 210-S$_1$ processes all originating and terminating SIP requests and responses associated with endpoints registered with S-CSCF 210-S$_1$ (including UE 105-1). S-CSCF 210-S$_1$ routes the SIP signaling towards its destination (e.g., towards P-CSCF 210-P$_1$ and UE 105-1), or towards UE 105-2 via I-CSCF 210-I. I-CSCF 210-I passes SIP signaling to/from S-CSCF 210-S$_1$ and S-CSCF 210-S$_2$. I-CSCF 210-I queries HSS 220 to learn the identity of the S-CSCF assigned to a given UE 105 so that it can properly forward the SIP signaling. HSS 220 includes a master user database (DB) that supports all of CSCFs 210 of IMS network 120. The master user DB of HSS 220 stores user subscription-related information (e.g., subscriber profiles), and performs authentication and authorization of the user. The subscriber profiles stored in the DB of HS 220 may include an indication of whether a given user has subscribed to usage of VoLTE network 110.

S-CSCF 210-S$_2$ processes all originating and terminating SIP requests and responses associated with endpoints registered with S-CSCF 210-S$_2$ (including UE 105-2). S-CSCF 210-S$_2$ routes the SIP signaling towards its destination (e.g., towards P-CSCF 210-P$_2$ and UE 105-2), or towards UE 105-1 via I-CSCF 210-I. P-CSCF 210-P$_2$ acts as an edge of IMS network 120 through which UE 105-2 obtains access. P-CSCF 210-P$_2$ maintains an awareness of all IMS endpoints that are currently registered with IMS network 120, and performs various manipulations of SIP signaling messages that are arriving from, or being sent to, the IMS endpoints (e.g., UEs 105-1 and 105-2). P-CSCF 210-P$_2$ maintains a connection with S-CSCF 210-S$_2$.

S-CSCF 210-S$_1$ and S-CSCF 210-S$_2$ may both send notification messages to VCC node 230 to indicate that a UE 105 is, or is not, provisioned to accept VoLTE calls (i.e., the user has, or has not, subscribed to usage of VoLTE network 110). S-CSCF 210-S$_1$ and S-CSCF 210-S$_2$ may obtain subscriber profile information from HSS 220 to determine whether UE 105-1 and/or UE 105-1 are subscribed for usage of VoLTE network 110. VCC node 230 may, based on the notification messages received from S-CSCF 210-S$_1$ and S-CSCF 210-S2, cause calls to or from a UE 105 to be routed either via legacy circuit-switched network 115 or via VoLTE network 110, as described in further detail with respect to FIGS. 5 and 6.

P-CSCF 210-P$_1$, S-CSCF 210-S$_1$, I-CSCF 210-I, S-CSCF 210-S$_2$, P-CSCF 210-P$_2$ and/or VCC 230 may each include functionality implemented in multiple, different network devices, or in a same, single network device.

The configuration of network components of portion 200, of the network environment 100 of FIG. 1A, shown in FIG. 2 is for illustrative purposes. Other configurations may be implemented. Therefore, portion 200 may include additional, fewer and/or different components that may be configured in a different arrangement than that depicted in FIG. 2.

Figure 3:
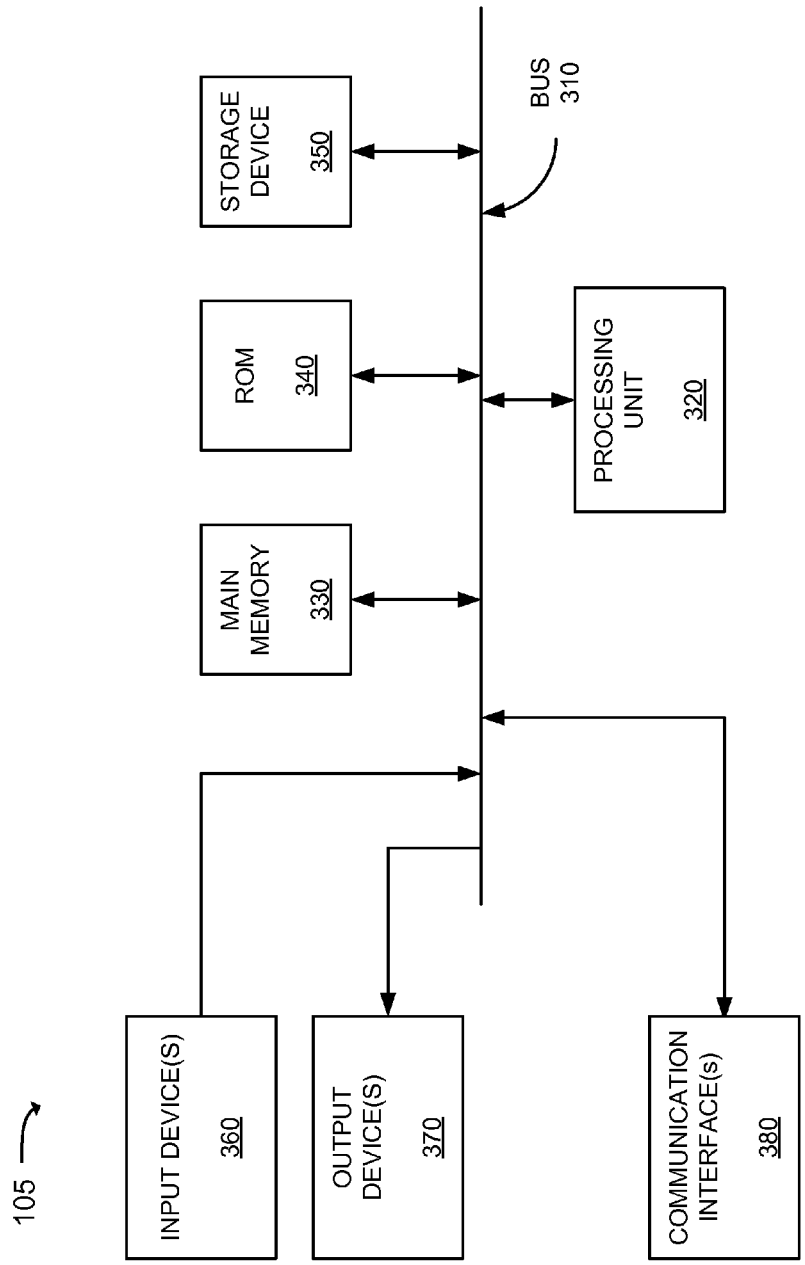
FIG. 3 is a diagram that depicts exemplary components of the user equipment of FIGS. 1A, 1B, and 2.

FIG. 3 is a diagram that depicts exemplary components of UE 105. CSCF 210, VCC 230, and HSS 220 may be similarly configured. UE 105 may include a bus 310, a processing unit 320, a main memory 330, a read only memory (ROM) 340, a storage device 350, an input device(s) 360, an output device(s) 370, and a communication interface(s) 380. Bus 310 may include a path that permits communication among the components of UE 105.

Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium. Main memory 330, ROM 340 and storage device 350 may each be referred to herein as a "tangible non-transitory computer-readable medium." The process/methods set forth herein can be implemented as instructions that are stored in main memory 330, ROM 340 and/or storage device 350 for execution by processing unit 320.

Input device 360 may include one or more mechanisms that permit an operator to input information into UE 105, such as, for example, a keypad or a keyboard, a display with a touch sensitive panel, voice recognition and/or biometric mechanisms, etc. Output device 370 may include one or more mechanisms that output information to the operator, including a display, a speaker, etc. Input device 360 and output device 370 may, in some implementations, be implemented as a user interface (UI) that displays UI information and which receives user input via the UI. Communication interface(s) 380 may include a transceiver that enables UE 105 to communicate with other devices and/or systems. For example, communication interface(s) 380 may include wired or wireless transceivers for communicating via network 125.

The configuration of components of UE 105 illustrated in FIG. 3 is for illustrative purposes. Other configurations may be implemented. Therefore, UE 105 may include additional, fewer and/or different components than those depicted in FIG. 3.

Figure 4:
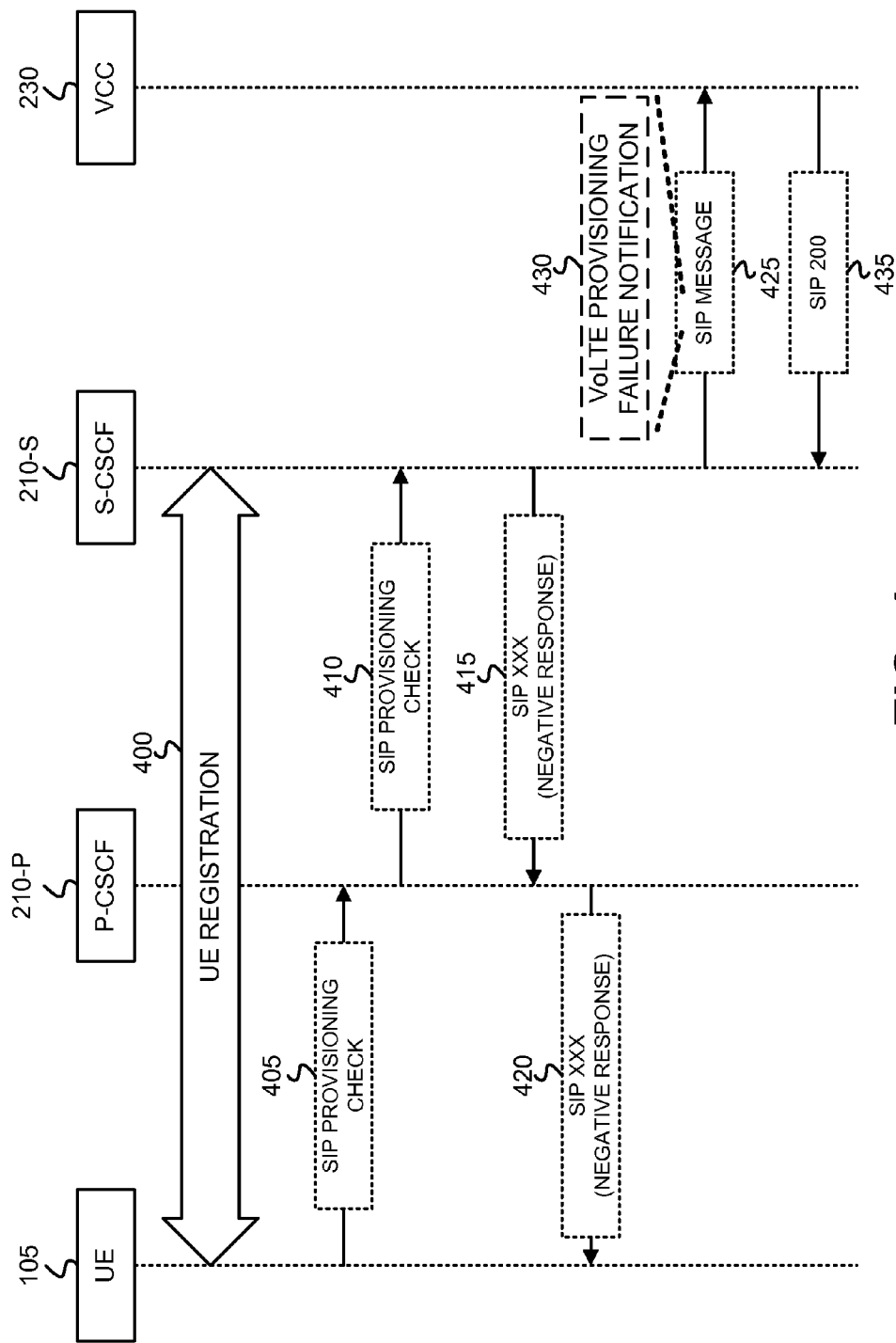
FIG. 4 is a diagram that depicts a simplified example of SIP messaging associated with the Voice Call Continuity node of FIG. 1A determining a correct VoLTE provisioning status of the user equipment, such that calls to/from the user equipment can be selectively routed either via a VoLTE network or via a legacy circuit-switched network.

FIG. 4 is a diagram that depicts a simplified example of SIP messaging associated with VCC node 230 determining a correct VoLTE provisioning status of UE 105, such that calls to/from UE 105 can be selectively routed either via VoLTE network 110 or via legacy circuit-switched network 115. Upon power up of UE 105, UE 105 engages in UE registration 400 with components of IMS network 120, including P-CSCF 210-P and S-CSCF 210-S. UE registration 400 involves messaging between UE 105 and the components of IMS network 120 that let the IMS network 120 know where UE 105 is, allows IMS network 120 to validate the user's credentials, and registers the user in the DB of HSS 220.

Subsequent to UE registration 400, UE 105 may send a SIP provisioning check message 405 to P-CSCF 210-P to determine if UE 105 has been successfully provisioned, and is currently provisioned, for usage of VoLTE network 110. P-CSCF 210-P, in turn, sends a corresponding SIP provisioning check message 410 to S-CSCF 210-S to check for successful VoLTE provisioning. S-CSCF 210-S obtains user 130's subscription information and performs a VoLTE provisioning check to determine if user 130 of UE 105 has subscribed to usage of VoLTE network 110 and if VoLTE service has been successfully provisioned to UE 105. If S-CSCF 210-S determines that user 130 has not subscribed to VoLTE and/or UE 105 has not yet been successfully provisioned for service via VoLTE network 110, then S-CSCF 210-S returns a SIP XXX message 415 that includes a negative response (where "XXX" refers generically to various different SIP messages that may be used in this circumstance). P-CSCF 210-P, in turn, returns a SIP XXX message 420 to UE 105 that includes the negative response to notify UE 105 that VoLTE service is not currently available to user 130 at UE 105.

If S-CSCF 210-S determines that user 130 has not subscribed to VoLTE and/or UE 105 has not yet been successfully provisioned for service via VoLTE network 110, then S-CSCF 210-S also sends a SIP message 425 to VCC node 230 that includes notification data 430 indicating a VoLTE provisioning failure notification. Upon receipt of SIP message 425, VCC node 230 stores the notification data 430 in conjunction with data associated with UE 105 and/or user 130. When calls are subsequently directed to/from UE 105 and user 130, VCC node 230 may check the stored notification data 430 to determine whether calls can be routed to/from UE 105 via VoLTE network 110. In circumstances where the notification data 430 indicates a VoLTE provisioning failure, VCC node 230 may cause calls directed to/from UE 105 to be routed via legacy circuit-switched network 115. Upon receipt of SIP message 425, VCC node 230 may return a SIP 200 message 435 to S-CSCF 210-S to acknowledge receipt of message 425.

In different circumstances (not shown in FIG. 4), if, upon receipt of SIP provisioning check message 410 at S-CSCF 210-S, S-CSCF 210-S determines that user 130 has subscribed to VoLTE and UE 105 has been successfully provisioned, and is currently provisioned, for service via VoLTE network 110, then S-CSCF 210-S may return a positive response message (not shown in FIG. 4) to UE 105 via P-CSCF 210-P. Under these circumstances, the SIP message 425 sent to VCC node 230 includes notification data (not shown) indicating VoLTE provisioning success. When calls are subsequently directed to/from UE 105 and user 130, VCC node 230 may check the stored notification data and determine that, based on the notification data indicating VoLTE provisioning success, the calls can be routed to/from UE 105 via VoLTE network 110.

Figure 5:
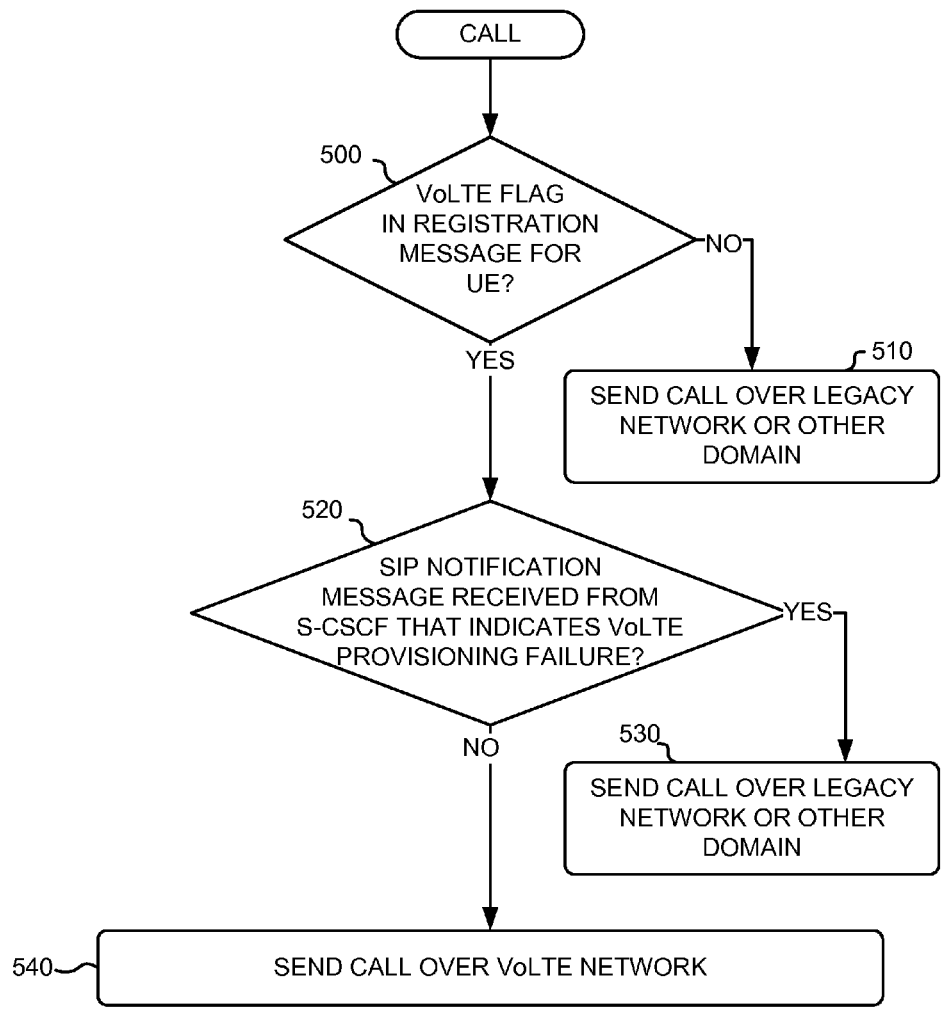
FIG. 5 is a flow diagram of an exemplary process for selectively routing calls to or from the user equipment via one of two different networks based on a correct determination of VoLTE provisioning status of the user equipment.

FIG. 5 is a flow diagram of an exemplary process for selectively routing calls to or from UE 105 via one of two different networks based on a correct determination of VoLTE provisioning status of UE 105. The exemplary process of FIG. 5 is described below with reference to the messaging diagram of FIG. 6. The exemplary process of FIG. 5 may be repeated for each incoming call to, or outgoing call from, UE 105. In an aspect, the steps of the process/method shown in FIG. 5 may proceed without UE 105 making a decision whether a call should be handled as a VoLTE session on a VoLTE network, or as a conventional call on a legacy telephony network (i.e., a legacy circuit-switched network).

Figure 6:
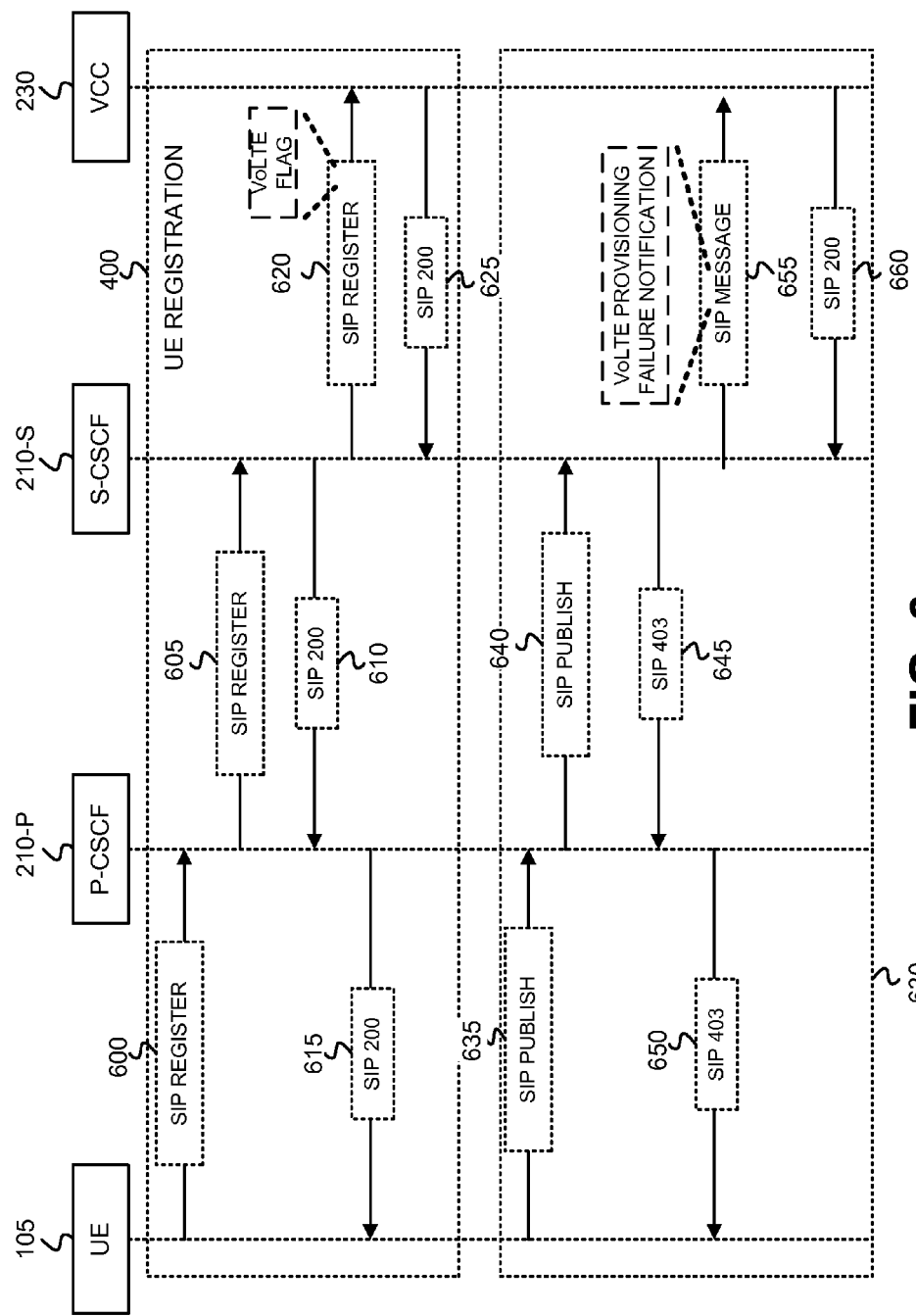
FIG. 6 is a diagram that depicts exemplary messaging between the user equipment and the IMS network associated with the exemplary process of FIG. 5.

The exemplary process may include VCC node 230 identifying whether a most recent registration message for UE 105 included a VoLTE flag (block 500). The messaging diagram of FIG. 6 depicts further exemplary details of the UE registration process 400 from FIG. 4. Upon device power-up, UE 105 may attempt to register with the IMS network 120 by sending a SIP registration message 600 to P-CSCF 210-P. SIP registration message 600 includes a flag that indicates that UE 105 is able to send and receive VoLTE calls. Upon receipt of registration message 600, P-CSCF 210-P returns a SIP 200 message 615 that acknowledges receipt of SIP registration message 600 and sends a registration message 605 to S-CSCF 210-S that includes the VoLTE flag of message 600. Upon receipt of registration message 605, S-CSCF 210-S returns a SIP 200 message 610 to P-CSCF 210-P acknowledging receipt of SIP registration message 605, and sends a corresponding SIP registration message 620 to VCC 230. SIP registration message 620 includes the VoLTE flag that indicates that UE 105 is able to send and receive VoLTE calls. Upon receipt of SIP registration message 620, VCC 230 returns a SIP 200 message 625 to S-CSCF 210-S acknowledging receipt of SIP registration message 620. VCC 230 checks SIP registration message 620 to identify the VoLTE flag that indicates that UE 105 is able to send and receive VoLTE calls, and stores data indicating the VoLTE capability of UE 105 based on the VoLTE flag.

If the registration message did not include the VoLTE flag (NO—block 500), then VCC node 230 causes the call to be sent over legacy network 115, or another domain (block 510). Upon a determination that SIP registration message 620 did not include the VoLTE flag, VCC node 230 sends instructions to S-CSCF 210-S instructing S-CSCF 210-S to route the incoming or outgoing call via legacy network 115. S-CSCF 210-S then causes the incoming or outgoing call to be routed via legacy network 115.

If the registration message includes the VoLTE flag (YES—block 500), then VCC node 230 determines if a SIP notification message has been received from S-CSCF 210-S that indicates a VoLTE provisioning failure (block 520). FIG. 6 depicts VoLTE provisioning status messaging 630 associated with determining if UE 105 has been provisioned to send and receive calls via VoLTE network 110. UE 105 initiates the provisioning status determination by a sending a SIP publish message 635 to P-CSCF 210-P, where SIP publish message 635 indicates that UE 105 is ready to make and receive VoLTE calls and also requests an indication from IMS network 120 that provisioning of UE 105 to send and receive calls via VoLTE network 110 has been successfully completed. SIP publish message 635 corresponds to a specific example of SIP provisioning check message 405 of FIG. 4. Upon receipt of SIP publish message 635, P-CSCF 210-P sends a corresponding SIP publish message 640 to S-CSCF 210-S. SIP publish message 640 corresponds to a specific example of SIP provisioning check message 410 of FIG. 4. Upon receipt of SIP publish message 640, S-CSCF 210-S checks to determine if UE 105 has been successfully provisioned to send/receive calls via VoLTE network 110. If UE 105 has not yet been successfully provisioned to send/receive calls via VoLTE network 110, S-CSCF 210-S returns a SIP 403 message 645 to P-CSCF 210-P, wherein SIP 403 message 645 includes a negative response indicating that UE 105 has not been successfully provisioned to send/receive calls via VoLTE network 110. SIP 403 message 645 corresponds to a specific example of message 415 of FIG. 4. In turn, P-CSCF 210-P returns a SIP 403 message 650 to UE 105 notifying UE 105 of the failure of VoLTE provisioning. SIP 403 message 650 corresponds to a specific example of message 420 of FIG. 4.

If S-CSCF 210-S's check to determine if UE 105 has been successfully provisioned to send/receive calls via VoLTE network 110 results in a negative determination (i.e., UE 105 is not currently provisioned), then S-CSCF 210-S sends a SIP message 655 to VCC 230 that indicates that UE 105 is currently not provisioned to send/receive calls via VoLTE network 110. SIP message 655 corresponds to SIP message 425 of FIG. 4. Additionally, if S-CSCF 210-S's check to determine if UE 105 has been successfully provisioned to send/receive calls via VoLTE network 110 results in a positive determination (i.e., UE 105 is currently successfully provisioned), then SIP message 655 sent from S-CSCF 210-S to VCC 230 indicates that UE 105 is currently provisioned to send/receive calls via VoLTE network 110. Upon receipt of SIP message 655, VCC 230 may return a SIP 200 message 660 that acknowledges receipt of SIP message 655. SIP 200 message 660 corresponds to SIP 200 message 435 of FIG. 4.

If, subsequent to receipt of SIP publish message 640, S-CSCF 210-S's check to determine if UE 105 has been successfully provisioned to send/receive calls via VoLTE network 110 identifies that UE 105 is currently successfully provisioned to send/receive calls via VoLTE network 110, then (not shown in FIG. 6) S-CSCF 210-S returns a SIP OK message to P-CSCF 210-P, wherein the SIP OK message includes a positive response indicating that UE 105 has/is successfully provisioned to send/receive calls via VoLTE network 110. In turn, P-CSCF 210-P returns a SIP OK message to UE 105 notifying UE 105 of the success of VoLTE provisioning.

If the SIP notification message indicates a VoLTE provisioning failure (YES—block 520), then VCC node 230 causes the call to be sent over circuit-switched network 115, or another network domain (block 530). Referring to FIG. 6, upon receipt of SIP message 655 indicating a VoLTE provisioning failure, VCC 230 may send instructions (not shown in FIG. 6) to S-CSCF 210-S instructing S-CSCF 210-S to cause calls to and from UE 105 to be routed via legacy circuit-switched network 115. If the SIP notification does not indicate a VoLTE provisioning failure (NO—block 520), then VCC node 230 causes the call to be sent over VoLTE network 110 (block 540). Referring again to FIG. 6, upon receipt of SIP message 655 indicating that UE 105 has/is successfully VoLTE provisioned, VCC 230 may send instructions (not shown in FIG. 6) to S-CSCF 210-S instructing S-CSCF 210-S to cause calls to and from UE 105 to be routed via VoLTE network 110.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with respect to FIG. 5, the order of the blocks may be varied in other implementations. Moreover, non-dependent blocks may be performed in parallel. Exemplary embodiments herein have been described as using SIP messages (e.g., SIP register, SIP 200, SIP OK, SIP 403, and SIP publish messages). However, protocols other than SIP may be used in the techniques described herein. Such protocols may employ messaging that is different than the SIP message described herein.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving a registration message at a first node in a call signaling network, wherein the registration message is associated with registering a user equipment (UE) with the call signaling network for sending or receiving calls, and wherein the registration message includes a flag that indicates that the UE is capable of sending or receiving calls via a Voice over Long Term Evolution (VoLTE) network;
receiving a notification message at the first node from a call session control node in the call signaling network, wherein the notification message indicates whether the UE is currently provisioned to engage in calls via the VoLTE network;
causing, by the first node, calls to or from the UE to be routed via the VoLTE network if the notification message indicates that the UE is currently provisioned to engage in calls via the VoLTE network; and causing, by the first node, calls to or from the UE to be routed via a legacy network, that is different than the VoLTE network, if the notification message indicates that the UE is currently not provisioned to engage in calls via the VoLTE network.

2. The method of claim 1, wherein the call signaling network comprises an Internet Protocol Multimedia Subsystem (IMS) network.

3. The method of claim 2, wherein the call session control node comprises a Call Session Control Function (CSCF) node in the IMS network.

4. The method of claim 3, wherein the CSCF node comprises a serving CSCF (S-CSCF) node in the IMS network.

5. The method of claim 1, wherein the registration message and the notification message comprise Session Initiation Protocol (SIP) messages.

6. The method of claim 1, wherein causing the calls to or from the UE to be routed via the VoLTE network comprises sending first instructions to the call session control node instructing the call session control node to route the calls to or from the UE via the VoLTE network, and wherein causing the calls to or from the UE to be routed via the legacy network comprises sending second instructions to the call session control node instructing the call session control node to route the calls to or from the UE via the legacy network.

7. A first network node, comprising:
a communication interface connected to a call signaling network; and
a processing unit configured to:
receive, via the communication interface, a registration message, wherein the registration message is associated with registering a user equipment (UE) with the call signaling network for sending or receiving calls,
receive, via the communication interface, a notification message from a call session control node in the call signaling network, wherein the notification message indicates whether the UE is currently provisioned to engage in calls via a Voice over Long Term Evolution (VoLTE) network,
cause calls to or from the UE to be routed via the VoLTE network if the notification message indicates that the UE is currently provisioned to engage in calls via the VoLTE network, and
cause calls to or from the UE to be routed via a legacy network, that is different than the VoLTE network, if the notification message indicates that the UE is currently not provisioned to engage in calls via the VoLTE network.

8. The first network node of claim 7, wherein the registration message includes a flag that indicates that the UE is capable of sending or receiving calls via the VoLTE network.

9. The first network node of claim 7, wherein the call signaling network comprises an Internet Protocol Multimedia Subsystem (IMS) network.

10. The first network node of claim 9, wherein the call session control node comprises a Call Session Control Function (CSCF) node in the IMS network.

11. The first network node of claim 10, wherein the CSCF node comprises a serving CSCF (S-CSCF) node in the IMS network.

12. The first network node of claim 7, wherein the registration message and the notification message comprise Session Initiation Protocol (SIP) messages.

13. The first network node of claim 7, wherein, when causing the calls to or from the UE to be routed via the VoLTE network, the processing unit is further configured to send first instructions to the call session control node instructing the call session control node to route the calls to or from the UE via the VoLTE network, and wherein, when causing the calls to or from the UE to be routed via the legacy network, the processing unit is further configured to send second instructions to the call session control node instructing the call session control node to route the calls to or from the UE via the legacy network.

14. A non-transitory computer-readable medium storing instructions executable by at least one processing unit of a first node in a call signaling network, the computer-readable medium comprising one or more instructions for:
receiving a registration message at the first node in the call signaling network, wherein the registration message is associated with registering a user equipment (UE) with the call signaling network for sending or receiving calls;
receiving a notification message at the first node from a call session control node in the call signaling network, wherein the notification message indicates whether the UE is currently provisioned to engage in calls via a Voice over Long Term Evolution (VoLTE) network;
causing, by the first node, calls to or from the UE to be routed via the VoLTE network if the notification message indicates that the UE is currently provisioned to engage in calls via the VoLTE network; and
causing, by the first node, calls to or from the UE to be routed via a legacy network, that is different than the VoLTE network, if the notification message indicates that the UE is currently not provisioned to engage in calls via the VoLTE network.

15. The non-transitory computer-readable medium of claim 14, wherein the registration message includes a flag that indicates that the UE is capable of sending or receiving calls via the VoLTE network.

16. The non-transitory computer-readable medium of claim 14, wherein the call signaling network comprises an Internet Protocol Multimedia Subsystem (IMS) network.

17. The non-transitory computer-readable medium of claim 16, wherein the call session control node comprises a Call Session Control Function (CSCF) node in the IMS network.

18. The non-transitory computer-readable medium of claim 17, wherein the CSCF node comprises a serving CSCF (S-CSCF) node in the IMS network.

19. The non-transitory computer-readable medium of claim 14, wherein the registration message and the notification message comprise Session Initiation Protocol (SIP) messages.

20. The non-transitory computer-readable medium of claim 14, wherein the one or more instructions for causing the calls to or from the UE to be routed via the VoLTE network further comprise one or more instructions for sending first instructions to the call session control node instructing the call session control node to route the calls to or from the UE via the VoLTE network, and wherein the one or more instructions for causing the calls to or from the UE to be routed via the legacy network further comprise one or more instructions for sending second instructions to the call session control node instructing the call session control node to route the calls to or from the UE via the legacy network.

* * * * *